United States Patent
Fish et al.

(10) Patent No.: US 7,177,844 B2
(45) Date of Patent: Feb. 13, 2007

(54) APPARATUS AND METHOD FOR ACTIVATION OF A SECURITY MODULE IN A SET-TOP RETAIL ENVIRONMENT

(75) Inventors: Charles M. Fish, Doylestown, PA (US); Donald W. Merino, Portland, OR (US); Charles A. Eldering, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 934 days.

(21) Appl. No.: 10/046,083

(22) Filed: Jan. 16, 2002

(65) Prior Publication Data

US 2003/0133572 A1 Jul. 17, 2003

(51) Int. Cl.
H04N 7/167 (2006.01)
(52) U.S. Cl. ............... 705/57; 380/201; 725/151
(58) Field of Classification Search ............. 705/54, 705/59, 64–67; 713/164–172; 380/200–203, 380/210; 709/227–229; 725/1–14, 86–87, 725/104, 151
See application file for complete search history.

(56) References Cited

U.S. PATENT DOCUMENTS

| | | | |
|---|---|---|---|
| 5,642,418 A * | 6/1997 | Farris et al. | 380/211 |
| 5,666,293 A * | 9/1997 | Metz et al. | 709/220 |
| 5,887,253 A * | 3/1999 | O'Neil et al. | 455/418 |
| 6,003,100 A * | 12/1999 | Lee | 710/301 |
| 6,038,551 A * | 3/2000 | Barlow et al. | 705/41 |
| 6,169,976 B1 * | 1/2001 | Colosso | 705/59 |
| 6,298,336 B1 * | 10/2001 | Davis et al. | 705/41 |
| 6,496,981 B1 * | 12/2002 | Wistendahl et al. | 725/112 |
| 6,832,349 B1 * | 12/2004 | Seamans | 715/500 |
| 7,036,738 B1 * | 5/2006 | Vanzini et al. | 235/486 |
| 2001/0037303 A1 * | 11/2001 | Mizrahi | 705/52 |

(Continued)

FOREIGN PATENT DOCUMENTS

WO WO 9831114 A1 * 7/1998

OTHER PUBLICATIONS

"New Products: Vela Research's CineView Brings MPEG-2 Video to PC Screens", EMedia Professional, v10, n11, p. 28, Nov. 1997, ISSN: 1090-946X.*

*Primary Examiner*—Mary D. Cheung
(74) *Attorney, Agent, or Firm*—Benjamin D. Driscoll

(57) ABSTRACT

An apparatus and method for activating a security module in a set-top terminal purchased from a retailer. A set-top terminal, along with a security device, is purchased from a retailer. This security device is a removable module that is inserted into the set-top terminal to permit reception of the services from the system operator. The security device includes a serial number that is registered with the system operator, and a physical layer key. The physical layer key cannot be read if the security device is disassembled. The set-top terminal is provided to the customer. The security device is retrieved by the retailer, who activates the security device by obtaining credit information from the customer, performing a credit check on the customer, establishing an account with the system operator, and retrieving an activation key from a system administrator. The activation key is a key that is downloaded to the security device to permit the reception of premium services from said system operator. The security device is then provided to the customer for insertion into the set-top terminal.

4 Claims, 2 Drawing Sheets

U.S. PATENT DOCUMENTS

2002/0046083 A1* 4/2002 Ondeck ........................ 704/14
2002/0140871 A1* 10/2002 Piotrowski et al. .......... 348/731
2002/0157115 A1* 10/2002 Lu .............................. 725/131
2003/0070174 A1* 4/2003 Solomon ...................... 725/98
2003/0115465 A1* 6/2003 Wodzianek et al. ......... 713/172

* cited by examiner

APPARATUS AND METHOD FOR ACTIVATION OF A SECURITY MODULE IN A SET-TOP RETAIL ENVIRONMENT

FIELD OF THE INVENTION

The present invention relates to the field of subscription television. More particularly, the present invention relates to the field of access control and retail sales of a removable module inserted into a television set-top terminal.

BACKGROUND OF THE INVENTION

Television is widely used in modern society as a source of both information and entertainment. Cable and satellite subscription systems can supplement local over-the-air broadcasting to provide dozens or even hundreds of channels of programming. This wide variety of programming accounts for the great popularity of subscription television. Additionally, the current trend is for subscription television systems to provide additional services such as premium channels, pay-per-view programming, video-on-demand programming, Internet and telephone network access.

In advanced subscription television systems, each subscriber is typically provided with a set-top terminal. The set-top terminal is a device containing electronic equipment that is used to connect the subscriber's television, or other electronic equipment, to the system operator's television system. The television set-top terminal processes the signal received from the television system to provide the services of the system to subscribers.

Previously, a set-top terminal could be obtained only from the system operator, generally as leased equipment. However, increasingly, a set-top terminal may be obtained from sources other than the system operator such as electronic equipment manufacturers, commercial retail outlets, and other vendors not affiliated with the system operator.

As the services from the subscription television system expand, security techniques for those services become crucial to ensure that only subscribers who have paid for the services have access to them. The importance of conditional access in contemporary television distribution networks is therefore undeniable, as well as in other applications that may require conditional access (e.g., streaming media, Internet applications). Reducing or eliminating piracy and/or signal theft not only benefits a system operator's ongoing business, but also protects the copyright holder of the content. As an aid in providing for this security, recently there has emerged the development and distribution of a removable, replaceable security device for use with a set-top terminal, often called a Point-of-Deployment (POD) module, or more generally, security separable module (SSM).

An SSM is a device that will permit conditional access by the subscriber to the subscription television system, while providing the required security against unauthorized signal reception. This device will not be integrally designed into a set-top terminal. Instead, subscribers will subsequently obtain the SSM from the equipment provider and interface it to a specially adapted port attached to the set-top terminal (also frequently called "the host").

As the retail availability of set-top terminals having SSM access is realized, consumers will need a convenient procedure to purchase at retail, a set-top terminal, a system subscription, and an SSM; and to have the SSM activated. It is, therefore, necessary to have a suitable method of distributing and activating the SSM in a manner that will insure proper access onto the subscription television system by authorized subscribers only. In the cellular phone industry, smart cards have been used to provide system security and conditional access. These cards allow subscriber information to be stored on a card that is inserted into the phone. Although this solution allows for the storage of subscriber related information on the card, methods for activation of the card at retail outlets and for preservation of access control integrity for video services are required.

Consequently, there is a need in the art for a method of distributing the SSM to the consumer while simultaneously insuring that the SSM cannot be copied or activated in an unauthorized manner, or as least that adequately practical security can be achieved.

SUMMARY OF THE INVENTION

It is an object of the present invention to meet the above-described needs and others. Specifically, it is an object of the present invention to provide an improved method for the activation of an SSM in a retail environment.

The present invention is preferably an apparatus and method for activating a security module in a set-top terminal purchased from a retailer. In accordance with the present invention, a set-top terminal, along with an SSM, is acquired from a retailer. This acquisition includes, but is not limited to the purchase or lease of equipment. The SSM is a removable module that is inserted into the set-top terminal to permit reception of the services from the system operator. The SSM includes a serial number that is registered with the system operator, and a physical layer key. The physical layer key cannot be read if the SSM is disassembled. The set-top terminal is provided to the customer. The SSM is retrieved by the retailer, who activates the SSM by obtaining credit information from the customer, performing a credit check on the customer, establishing an account with the system operator, and retrieving an activation key from a system administrator. The activation key is a key that is loaded into the SSM to permit the reception of services from said system operator. The SSM is then provided to the customer for insertion into the set-top terminal.

Additional objects, advantages and novel features of the invention will be set forth in the description which follows or may be learned by those skilled in the art through reading these materials or practicing the invention. The objects and advantages of the invention may be achieved through the means recited in the attached claims.

These and other objects, advantages, aspects and features of the present invention will be more fully understood and appreciated upon consideration of the following detailed description, presented in conjunction with the accompanying drawings

BRIEF DESCRIPTION OF THE DRAWINGS

The accompanying drawings illustrate the present invention and are a part of the specification. Together with the following description, the drawings demonstrate and explain the principles of the present invention.

Other objects and advantages of the invention will become apparent from a study of the specification and drawings in which.

DETAILED DESCRIPTION OF THE INVENTION

The following description is presented to enable any person skilled in the art to make and use the invention, and is provided in the context of a particular application and its requirements. Various modifications will be readily apparent to those skilled in the art, and the generic principles defined herein may be applied to other embodiments and applications without departing from the spirit and scope of the invention.

It is an apparent trend that subscription television system operators (also called multi-channel video or multiple system operators, "MSO") allow for the purchase of a set-top terminal by individual consumers at retail. In order to preserve the value of subscription television services, the system operator will require the consumer to purchase an SSM. The present invention allows for the retail outlet to activate the SSM, thus providing a convenient means for allowing a consumer to subscribe to system services and receive an activated SSM, without putting the access control system at risk. The present invention also requires system operators to establish an independent means of distributing the SSMs.

To provide a detailed discussion of the present invention, reference is now made to the drawings.

Figure 1:
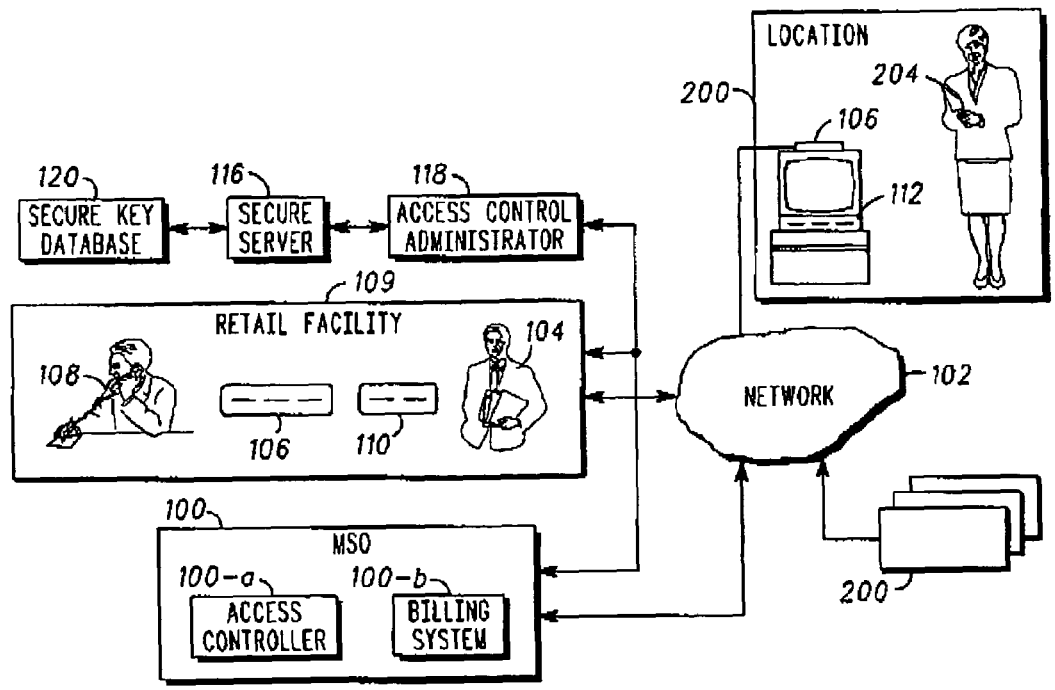
FIG. 1 is a block diagram of a system for activating a security module in a set-top terminal purchased from a retailer.

The elements of the system are shown in FIG. 1. The subscription television system operator, shown in FIG. 1 as the MSO 100, distributes premium television programming for a subscription fee to various system subscribers over a multi-channel video programming network. These subscribers are depicted in FIG. 1 as the purchaser 104 and as subscriber 204. This programming network 102 includes, but is not limited to, high bandwidth cable, multi-channel broadcast television, direct broadcast satellite, multi-channel multi-point distribution service, satellite master antenna television, and the like.

As shown in FIG. 1, the set-top terminal 106 is for use with the programming network 102 to connect the subscriber's television set 112, or other electronic equipment, to the system operator's programming network 102. The set-top terminal 106 processes the signal received from the network 102. Processing within the set-top terminal 106 includes conditioning of the received signal such as decryption, error correction, decoding, descrambling, and the like. This processing occurs within the set-top terminal 106 prior to the presentation of that processed signal to the subscriber's television set 112.

The MSO 100 of FIG. 1 may be a headend facility that includes an access controller 100-*a* and a billing system 100-*b*.

The billing system 100-*b* is a computer system containing a billing system database. The billing system database stores the identities of the subscribers 204 who are authorized to receive programming service from the MSO 100. The billing system database also stores the services to be received by the subscriber 204 and the subscriber set-top terminals 106 that are interfaced to the network 102. In addition, the billing system 100-*b* generates the invoices for the subscriber 204.

The access controller 100-*a* controls access by the set-top terminal 106 to programming content provided by the MSO 100. Using a selective addressing function to independently address a specific set-top terminal 106, the access controller 100-*a* controls the set-top terminal 106 by initiating a response from the addressed set-top terminal 106 and by tracking of all communications originating from the set-top terminal 106. Although FIG. 2 depicts the access controller 100-*a* as located at the headend facility, the access controller 100-*a* can be located at a site other than the headend facility, such as a central business office.

The access controller 100-*a* is configured to communicate with the billing system 1100-*b* over an interface link. Instructions are sent from the billing system 100-*b* to the access controller 100-*a*. These instructions command the access controller 100-*a* to authorize conditional access by a subscriber set-top terminal 106 to programming content provided by the MSO 100. Whenever a subscriber 204 is permitted conditional access to a system service, the billing system 100-*b* communicates authorization rights of the subscriber 204 to the access controller 100-*a*, which in turn transfer these rights to the subscriber set-top terminal 106.

Although the set-top terminal 106 is depicted within FIG. 1 as a stand-alone unit, the features of this terminal 106 may be integrally incorporated as a subsystem of another electronic component. Moreover, the set-top terminal 106 may include therein, a converter terminal, interactive communications equipment, and equipment used by consumers to access multi-channel video programming and other services offered over multi-channel video programming systems.

Figure 2:
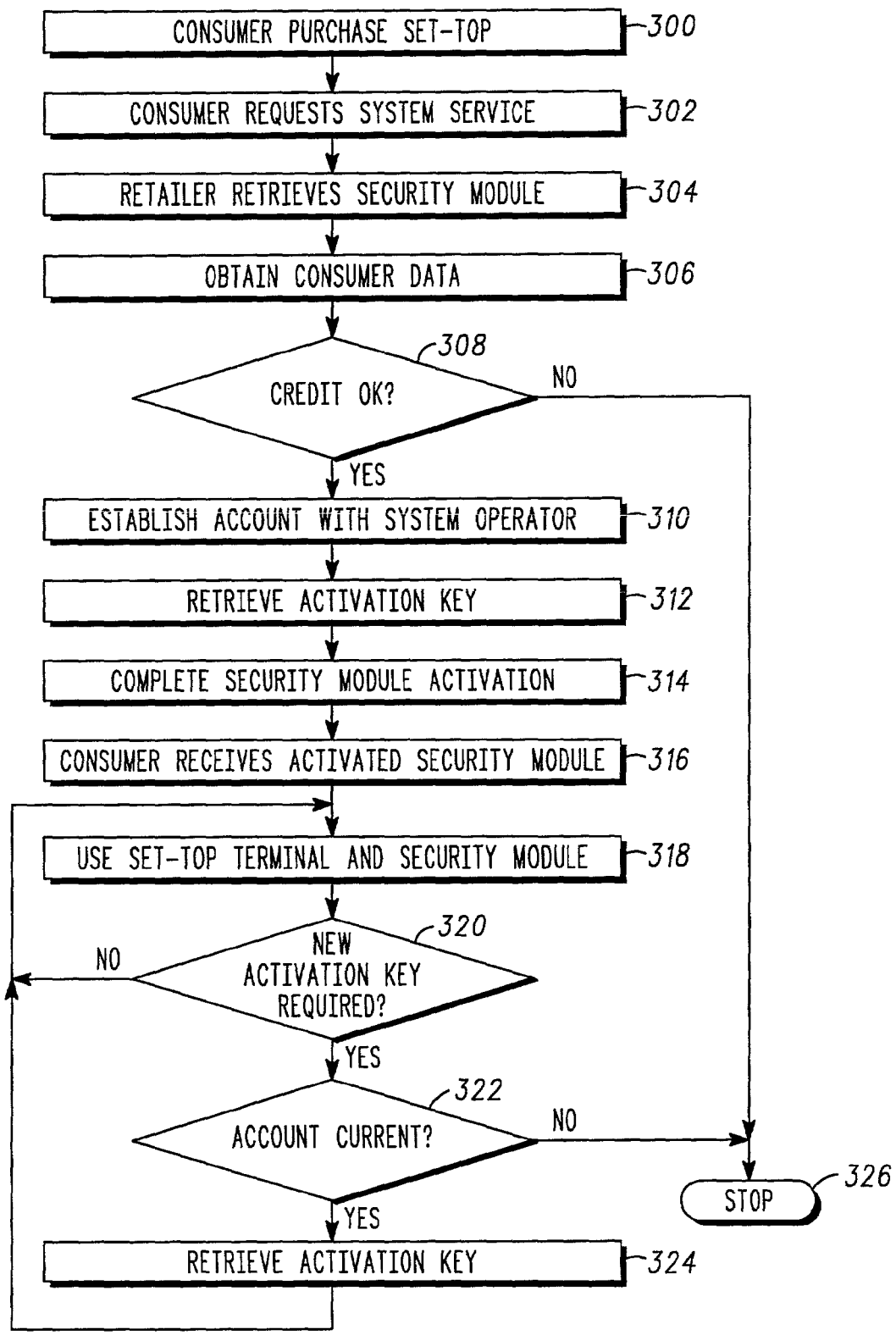
FIG. 2 is a flowchart illustrating the activation of the SSM.

Referring to FIG. 2, a flowchart illustrating an overview of the present invention is shown. In step 300 of FIG. 2, the purchaser 104 purchases or leases a set-top terminal 106 and an SSM 110 from a retailer 108 of such equipment. The retailer 108 is a merchant with a retail facility 109. The retailer 108 includes an electronic equipment manufacture and a commercial retail outlet. The retailer 108 also includes other vendors not affiliated with the MSO 100, an electronics store, a department store, or any physical store where set-top terminals 106 are sold. The retailer 108 of the set-top terminal 106 may also include a virtual store such as a merchant that does business by way of the Internet.

To receive system services from the MSO 100, a request must be specifically made by the purchaser 104 to either the retailer 108 or the MSO 100. The purchaser 104 makes this request during the purchase of the set-top terminal 106 or at a later time. This request is depicted as step 302 of FIG. 2. Along with the set-top terminal 106 and the SSM 110, the purchaser 104 may also receive a card such as a credit card or a debit card. This card is useable for the purchase of programming content from the MSO 100, such as specific pay-per-view events or as a billing credit. Additionally, this card is useable as a promotional aid to stimulate sales of the set-top terminal 106 or sales of other goods and services.

In step 304 of FIG. 2, the retailer 108 will retrieve the SSM 110. The SSM 110 is retained by the retailer 108 in a storage area within the retail facility 109, such as a storeroom or under a store counter, or retained in another secure location. The SSM 110 permits conditional access (decryption, descrambling and decoding) by the subscriber 204 to content offered by the MSO 100, while providing the required security against unauthorized signal reception. However, the SSM 110 must be authorized and inserted into a port within the set-top terminal 106 in order to permit access to the programming content provided by the MSO 100. Once retrieved, the retailer 108 will authorize the SSM 110. Authorization of the SSM 110 is shown within steps 306 to 314 of FIG. 2.

To become a subscriber, the purchaser 104 would be required to provide to the retailer 108, a subscription service agreement and consumer credit data. Preserving the consumer's privacy by safeguarding this consumer credit data is one result of the present invention. In step 306 of FIG. 2, the retailer 108 obtains consumer data from the purchaser 104. This data typically includes consumer credit data. Also, through the retailer 108, the MSO 100 may collect any information deemed necessary to provide service to the purchaser 104.

As shown in step 308 of FIG. 2, the retailer 108 performs a customer verification check on the purchaser using the consumer credit data to verify that the purchaser is a good credit risk for the system services being requested. The customer verification check may be performed using a dial-up telephone network, a private network, or the Internet.

Using criteria selected by the MSO 100, the retailer 108 may implement several types of inquiries, such as a credit check, to perform this customer verification check. In particular, the retailer 108 interrogates various credit reporting agencies using the consumer credit data acquired from the purchaser 104. After interrogating the various credit reporting agencies, the retailer 108 only provides a conclusion of creditworthiness to the MSO 100. The subscription service agreement and consumer credit data are not provided to the MSO 100 at that time. Instead, the retailer 108 can establish a file containing the consumer credit data for the purchaser 104 in a local database 114, which can be transferred to a MSO 100 at a later time. When the retailer 108 is a vendor such as a retail outlet, the retailer 108 may perform an additional inquiry using data obtained from a combination of network databases. For example, the networked databases associated with the retail outlet can be used together to establish an account for the subscriber 204, to authorize the SSM 110, and to provide some selected level of subscriber information and preferences to the MSO 100. Flexibility in combining a customer verification check with the establishment of a service account is an advantage of the present invention.

If it is determined that the purchaser 104 is not a good candidate for receiving system service, the purchaser 104 is then notified of this fact and the process proceeds to step 326 of FIG. 2 where it is terminated.

The present invention may also facilitate "tiering" of subscriber privacy, in which different levels of consumer subscriber information are shared with the MSO 100 and/or retailer 108 in return for some incentive to the subscriber 204. This incentive may be provided by either the MSO 100 or the retailer 108, or both. For example, the subscriber 204 who is willing to permit unlimited monitoring of the viewing "click stream" might receive various enhanced services, incentive offers, and the like.

Once it has been determined from the consumer credit data that the purchaser 104 is acceptable to the MSO 100 by meeting predetermined criteria for creditworthiness, the MSO 100 can then establish the service to the subscriber 204 and notify an access control administrator 118 that the retailer 108 can authorize the SSM 110. The access control administrator 118 can be integrated into the MSO 100 as the access controller 100-*a* described hereinabove, can be an independent service provider, or can be affiliated with the manufacturer of the set-top terminal 106. The access control administrator 118 functions to prevent the reception of system services through the use of a "cloned" or otherwise unauthorized SSM 110.

In step 310 of FIG. 2, a service account is established with the MSO 100 to provide service to the subscriber set-top terminal 106 once it has been determined that the subscriber 204 meets the particular criteria established by the MSO 100. Both the SSM 110 and the set-top terminal 106 have a separate and unique serial number for identification purposes. Once a service account is established, the MSO 100 prompts the access controller 100-*a* to register this serial number for the new set-top terminal 106 and the serial number for the SSM 110. The access controller 100-*a* also prompts billing system 100-*b* to add the new set-top terminal 106 and the SSM 110 to the billing system database.

Figure 3:
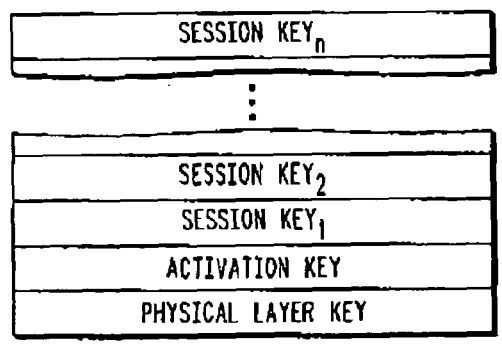
FIG. 3 is a key hierarchy of the present invention.

Security techniques in an advanced subscription television system are essential to ensure that conditional access to the system services offered by the MSO 100 is given to only those subscribers 104 who are granted such access. FIG. 3 illustrates a series of content decryption keys having a key hierarchy used to implement conditional access to the services offered by the MSO 100. This key hierarchy includes content decryption keys such as a physical layer key, an activation key, and session keys. These content decryption keys are provided only to the combination of the set-top terminal 106 and the SSM 110 that is authorized for conditional access, thereby permitting conditional access to the services offered by the MSO 100 by allowing the decryption of those services by an authorized set-top terminal 106 while inhibiting decryption of services by an authorized set-top terminal 106 or other reception devices. Various combinations of keys can be used in order to insure that once authorized, the keys stored within the SSM 110 cannot be duplicated or extracted from the SSM 110 while in use.

A physical layer key provides base layer security to content offered by the MSO 100, and is associated uniquely with the SSM 110. This key is preferably embedded within the SSM 110 at the time of manufacture and cannot be subsequently changed. Embedding the physical layer key within the SSM 110 may include known security techniques that result in the erasure or destruction of the physical layer key when the SSM 110 is tampered with. A number of known mechanisms for embedding the physical layer key can be utilized, including deposition of multiple layers of metal on top of an integrated circuit that contains the physical layer key. As a result, the physical layer key cannot be read, even if the SSM 110 is disassembled.

An activation key interacts with the physical layer to serve as a second layer of security. Once the account has been established with the MSO 100, the process proceeds to step 312 of FIG. 2. Activation keys are stored in the secure key database 120. In step 312, the access control administrator 118 commands the secure server 116 to prompt the secure key database 120 to retrieve the activation key from the secure key database 120. The access control server 116 can be located with the access control administrator 118. Alternatively, when arrangements have been made between the retailer 108 and the equipment manufacturer, the access control server 116 can be located with the retailer 108, or can be part of the retail outlet's enterprise network.

Once the activation key is retrieved from the secure key database 120, the secure server 116 supplies the activation key for the purchased set-top terminal 106 to the retailer 108. Specifically, the secure server 116 transfers the activation key to the retailer 108 through the network 102, either as an encrypted data bit stream or an unencrypted data bit stream. This network 102 includes, but is not limited to, any type of private or public network such as the Internet, an Intranet, enterprise network, a telephone line, or the programming network managed by the MSO 100. If the activation key is transmitted to the retailer 108 as an encrypted data bit stream, the physical layer key may be used to decrypt the encrypted activation key. Upon receipt, the retailer 108 then loads the activation key into the SSM 110. This access control administration function for retrieving the activation key as previously described can be automated such that an access control server 116 distributes the information necessary for authorization of the SSM 110, without the intervention of a human. The activation key remains valid until changed by a subsequent activation key.

Once the subscriber 204 has subscribed to the appropriate set of system services and the SSM 110 has been authorized, as shown in step 314 of FIG. 2, the subscriber 204 receives the SSM 110 directly from the retailer 108, as shown in step 316 of FIG. 2. The SSM 110 is then inserted into a slot or port on the set-top terminal 106, providing the purchaser access of the system services that have been subscribed to. When the retailer 108 performs the sale of the set-top terminal 106 by other than an in person, face-to-face exchange with the purchaser 104, such as by mail order or over the Internet, the authorization key is downloaded into the SSM 110 prior to shipment of the set-top terminal 106 and the SSM 110 to the purchaser 104.

During step 316, the purchaser 104 also receives a set of basic unencrypted services provided by the MSO 100. This set of basic unencrypted services, also known as "basic tier service," is typically the lowest price service that is available to the purchaser 104. The channels provided as part of this service are also known in the art as "in the clear" channels. Basic tier service is required for access to the additional system services, including premium services, offered by the MSO 100.

In step 318 the purchaser 104 transports the set-top terminals 106 to the location 200 where it will be used along with the television set 112 for viewing programming content provided by the MSO 100. Once at that location 200, the subscriber will contact the MSO 100 to gain conditional access to the additional system services that include premium programming. Once authorized, and after insertion of the SSM 110 into the set-top terminal 106, the subscriber 204 is then permitted conditional access to the programming content. Removal of the SSM 110 preferably renders the set-top terminal 106 non-functional.

The MSO 100 distributes premium programming over the network 102 for a subscription fee. Such premium programming includes premium channel programming and also includes special programming events such as pay-per-view events. The access controller 100-a controls access by the set-top terminal 106 to programming content provided by the MSO 100. Once the MSO 100 establishes that the premium programming is to be provided to the set-top terminal 106, session keys are sent by the access controller 100-a to the particular set-top terminal 106 for the particular time period that the premium programming is to be delivered to the set-top terminal 106.

Session keys interact with the physical layer and the activation key to serve as an additional layer of security. In FIG. 3, SESSION KEY$_1$ through SESSION KEY$_n$ are depicted, "n" being the number of session keys stored within the SSM 110. The session keys can be changed periodically and are valid only for the particular time period that the premium programming is being delivered. SESSION KEY$_1$ changes relatively infrequently, while SESSION KEY$_n$ changes relatively many times a minute. When the session keys are sent as an encrypted bit stream, decryption of the encrypted session keys may be achieved using the activation key.

The premium programming is transmitted as a scrambled signal from the MSO 100 to the set-top terminal 106. The set-top terminal 106 receives the transmitted signal in its scrambled form. Session keys contained within the SSM 100 permit the decryption/descrambling of the premium programming. The set-top terminal 106 transforms the scrambled premium programming back into its original form only when the proper session keys are stored within the SSM 110.

In step 320 the present invention tests whether an updated activation key is required. Reasons for this test include, but are not limited to, situations where the activation key is updated for security reasons and situation where the activation key is updated for business reasons such as upon payment of the cable invoice.

In step 322, the access controller 100-a communicates with the billing system 100-b to receive instructions regarding the account status for the subscriber 204. If instructions sent from the billing system 100-b indicate that the account is delinquent or that the set-top terminal 106 is not otherwise authorized to receive system services, then a new activation key is not provided to the set-top terminal 106 and the process proceeds to step 326. But if instructions sent from the billing system 100-b indicate that the account is not delinquent and that the set-top terminal 106 is authorized to receive system services, then the access controller 100-a will authorize the subscriber set-top terminal 106 conditional access to programming content by generating a message for delivery to the set-top terminal 106.

As show in step 324, the delivered message will include the updated activation key. Once received by the set-top terminals 106, this updated activation key will replace the activation key presently existing within the SSM 110. Within step 324, the retailer 108 does not load an activation key into the SSM 110 after the initial activation of the SSM 110. Instead, the retailer 108 downloads the activation key into the SSM 110 without any intervention.

The preceding description is intended to enable others skilled in the art to best utilize the invention in various embodiments and with various modifications as is suited to the particular use contemplated. The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A system for rendering video content comprising:
   a set-top terminal that has at least one port;
   a security separable module that includes a physical layer key and an activation key, wherein the security separable module is removably coupled to the set-top terminal via the at least one port and the physical layer key decrypts the activation key, wherein the physical layer key is embedded at the time of manufacture of the security separable module and the activation key is supplied to the security separable module after manufacture of the security separable module.

2. The system of claim 1 further comprising:
   a session key stored in the security separable module that allows rendering of the video content.

3. The system of claim 1 wherein the activation key is supplied to the security separable module by a retailer.

4. The system of claim 1 wherein the activation key is supplied to the security separable module through a network.

* * * * *